US008244933B1

United States Patent
New

(10) Patent No.: US 8,244,933 B1
(45) Date of Patent: Aug. 14, 2012

(54) METHOD AND APPARATUS FOR INTER-IC COMMUNICATION

(75) Inventor: Bernard J. New, Carmel Valley, CA (US)

(73) Assignee: Xilinx, Inc., San Jose, CA (US)

( * ) Notice: Subject to any disclaimer, the term of this patent is extended or adjusted under 35 U.S.C. 154(b) by 107 days.

(21) Appl. No.: 12/836,494

(22) Filed: Jul. 14, 2010

(51) Int. Cl.
    *G06F 13/00* (2006.01)
(52) U.S. Cl. .......................................... 710/33; 710/31
(58) Field of Classification Search .................... None
    See application file for complete search history.

(56) References Cited

U.S. PATENT DOCUMENTS

| 6,505,269 | B1 * | 1/2003 | Potter ............................ 711/202 |
| 7,673,087 | B1 * | 3/2010 | Ansari et al. ................... 710/241 |
| 8,006,021 | B1 * | 8/2011 | Li et al. ........................... 710/306 |
| 8,019,950 | B1 * | 9/2011 | Warshofsky et al. .......... 711/154 |
| 2004/0098549 | A1 * | 5/2004 | Dorst ............................. 711/167 |
| 2005/0195677 | A1 * | 9/2005 | Salmon et al. ............ 365/230.06 |
| 2007/0091104 | A1 * | 4/2007 | Singh et al. .................... 345/531 |
| 2008/0010435 | A1 * | 1/2008 | Smith et al. ...................... 712/10 |
| 2008/0162759 | A1 * | 7/2008 | Garlepp et al. ................ 710/110 |

* cited by examiner

*Primary Examiner* — Henry Tsai
*Assistant Examiner* — Kris Rhu
(74) *Attorney, Agent, or Firm* — Robert M. Brush; LeRoy D. Maunu

(57) ABSTRACT

Method and apparatus for inter-IC communication are described. In some examples, an integrated circuit (IC) includes core circuitry configured to process input data and provide output data; input/output (IO) circuitry configured to receive the input data, and transmit the output data; a control circuit configured to provide a selection signal; and an inter-IC communication port coupled between the core circuitry and the IO circuitry and configured to pass the input data and the output data, the inter-IC communication port having a memory interface and a memory controller, the inter-IC communication port configured to selectively couple either the memory interface or the memory controller between the core circuitry and the IO circuitry responsive to the selection signal.

17 Claims, 5 Drawing Sheets

METHOD AND APPARATUS FOR INTER-IC COMMUNICATION

FIELD OF THE INVENTION

One or more aspects of the present invention relate generally to integrated circuits and, more particularly, to a method and apparatus for inter-IC communication.

BACKGROUND

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes configurable logic blocks (CLBs), programmable input/output blocks (IOBs), and other types of logic blocks, such as memories, microprocessors, digital signal processors (DSPs), and the like. The CLBs, IOBs, and other logic blocks are interconnected by a programmable interconnect structure. The CLBs, IOBs, logic blocks, and interconnect structure are typically programmed by loading a stream of configuration data (known as a bitstream) into internal configuration memory cells that define how the CLBs, IOBs, logic blocks, and interconnect structure are configured. An FPGA may also include various dedicated logic circuits, such as digital clock managers (DCMs), input/output (I/O) transceivers, boundary scan logic, and the like.

A growing problem with FPGAs, as well as with ICs in general, is that the available number of transistors to implement functionality is outpacing the number of input/output (IO) pins available to handle the input and output data. Consequently, FPGAs (and other ICs) are becoming IO bound. In the particular application of inter-FPGA (or inter-IC) communication, such IO limitations can deleteriously affect the bandwidth of the inter-communication of data between the devices.

Accordingly, there exists a need in the art for a method and apparatus for inter-IC communication with improved bandwidth.

SUMMARY

An integrated circuit (IC) is described. In some embodiments, the IC comprises core circuitry configured to process input data and provide output data; input/output (IO) circuitry configured to receive the input data, and transmit the output data; a control circuit configured to provide a selection signal; and an inter-IC communication port coupled between the core circuitry and the IO circuitry and configured to pass the input data and the output data. The inter-IC communication port has a memory interface and a memory controller, and is configured to selectively couple either the memory interface or the memory controller between the core circuitry and the IO circuitry responsive to the selection signal.

According to some embodiments, the IC comprises a programmable logic device (PLD), the core circuitry comprises a programmable fabric, and the IO circuitry comprises input/output logic blocks (IOBs).

In some embodiments, the IO circuitry is configured to communicate with a memory bus. The memory interface of the inter-IC communication port can be configured with an address on the memory bus. The memory controller can be configured to be a bus master of the memory bus.

In some embodiments, the IO circuitry is configured to communicate with a sideband bus, the control circuit is coupled to the IO circuitry and is configured to provide a notification in response to configuring the selection signal to select the memory interface, and the IO circuitry is configured to send the notification towards another IC on the memory bus over the sideband bus.

In some embodiments, the IO circuitry is configured to communicate with a sideband bus, the control circuit is coupled to the IO circuitry and configures the selection signal to select the memory controller in response to a notification, and the IO circuitry is configured to receive the notification over the sideband bus from another IC on the memory bus.

An apparatus for communication between a first IC and a second IC is also described. In some embodiments, the apparatus includes first core circuitry in the first IC and second core circuitry in the second IC; a first inter-IC communication port in the first IC coupled to the first core circuitry and configured to implement memory controller; a second inter-IC communication port in the second IC coupled to the second core circuitry and configured to implement a memory interface; a memory bus; first IO circuitry in the first IC coupled between the memory bus and the first inter-IC communication port; and second IO circuitry in the second IC coupled between the memory bus and the second inter-IC communication port.

In some embodiments, the memory controller is a bus master of the memory bus, and the memory interface is configured with an address on the memory bus. The first core circuitry can be configured to send data to the second core circuitry by controlling the memory controller to write the data to the address of the memory interface over the memory bus. The first core circuitry can be configured to receive data from the second core circuitry by controlling the memory controller to read the data from the address of the memory interface over the memory bus.

In some embodiments, the first IC comprises a first programmable logic device (PLD), the first core circuitry comprises a programmable fabric in the first PLD, and the first IO circuitry comprises first input/output logic blocks (IOBs), while the second IC comprises a second PLD, the second core circuitry comprises a programmable fabric in the second PLD, and the second IO circuitry comprises second input/output logic blocks (IOBs).

In some embodiments, the apparatus further includes a memory coupled to the memory bus. The first core circuitry is configured to send data to be read by the second core circuitry by controlling the memory controller to write the data to the memory over the memory bus.

In some embodiments, the apparatus further includes a memory coupled to the memory bus having data stored therein produced by the second core circuitry. The first core circuitry is configured to receive the data by controlling the memory controller to read the data from the memory over the memory bus.

Also described is a method of communicating between a first IC and a second IC, the first IC including a first inter-IC communication port having a memory controller and memory interface, the second IC including a second inter-IC communication port having a memory controller and a memory interface. In some embodiments, the method includes controlling the first inter-IC communication port to couple the memory controller therein between first core circuitry and first input/output (IO) circuitry in the first IC; controlling the second inter-IC communication port to couple the memory interface between second core circuitry and second IO circuitry in the second IC; and sending first data from the first core circuitry to the second core circuitry over a memory bus between the first IO circuitry and the second IO circuitry under control of the memory controller in the first inter-IC communication port.

In some embodiments, the sending comprises controlling the memory controller in the first inter-IC communication port to write the first data to an address configured in the memory interface.

In some embodiments, the sending comprises: controlling the memory controller in the first inter-IC communication port to write the first data to a memory coupled to the memory bus; controlling the first inter-IC communication port to couple the memory interface therein between the first core circuitry and the first IO circuitry in the first IC; sending a notification from the first IC to the second IC; controlling the second inter-IC communication port to couple the memory controller therein between the second core circuitry and the second IO circuitry in the second IC in response to the notification; and controlling the memory controller in the second inter-IC communication port to read the first data from the memory.

In some embodiments, the method further includes receiving second data from the second core circuitry at the first core circuitry over the memory bus under control of the memory controller in the first inter-IC communication port. The receiving can include controlling the memory controller in the first inter-IC communication port to read the second data from an address configured in the memory interface. Alternatively, the receiving can include controlling the memory controller to read the second data from a memory coupled to the memory bus.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION

Figure 1:
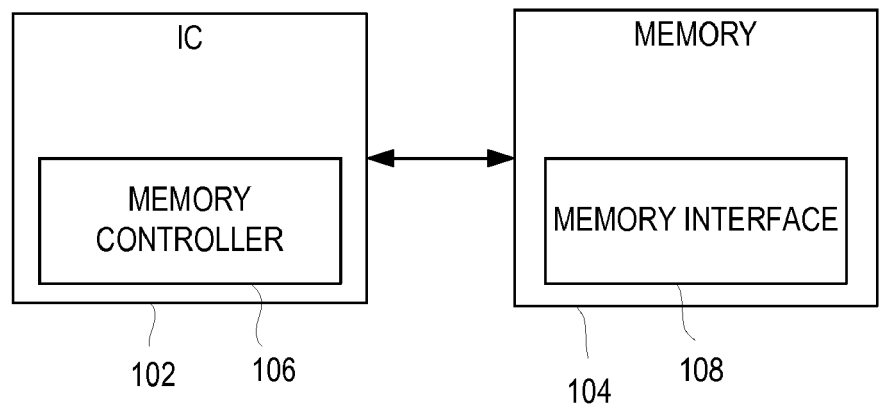
FIG. 1 is a block diagram depicting conventional communication between an integrated circuit (IC) and a memory.

FIG. 1 is a block diagram depicting conventional communication between an integrated circuit (IC) 102 and a memory 104. The IC 102 can include a memory controller 106, and the memory 104 can include an interface 108. The memory controller 106 is configured to communicate with the interface 108 for transferring data between the IC 102 and the memory 104. The memory controller 106 is typically implemented using dedicated hardware in the IC 102 (e.g., mask programmed) and thus the functionality of the memory controller 106 is fixed at the time of manufacture. Further, the memory 104 is mask-programmed to function as a memory device for storing bits of data. The memory 104 is not configured to perform any other functions.

Figure 2:
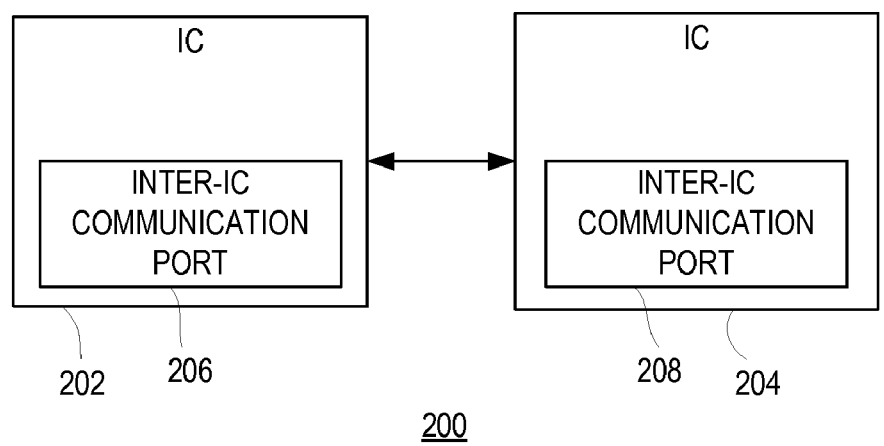
FIG. 2 is a block diagram depicting an IC system.

FIG. 2 is a block diagram depicting an IC system 200. The IC system 200 includes an IC 202 and an IC 204. The IC 202 includes an inter-IC communication port 206, and the IC 204 includes an inter-IC communication port 208. The inter-IC communication ports 206 and 208 can be configured for point-to-point communication with one another for transferring data between the IC 202 and the IC 204. In particular, each inter-IC communication port 206 and 208 can be configured to function as either a memory controller or a memory interface. For example, assume the inter-IC communication port 206 is configured as a memory controller, and the inter-IC communication port 208 is configured as a memory interface. The IC 202 can send data to the IC 204 by causing the inter-IC communication port 206 to "write" data to the inter-IC communication port 208. The IC 202 can receive data from the IC 204 by causing the inter-IC communication port 206 to "read" data from the inter-IC communication port 208. The IC 204 can function in a similar manner by configuring the inter-IC communication port 208 as a memory controller, and the inter-IC communication port 206 as a memory interface. In some embodiments, the ICs may be PLDs, such as FPGAs. Notably, neither of the ICs 202 and 204 is solely a memory device, such as a random access memory (RAM) or the like.

Figure 3:
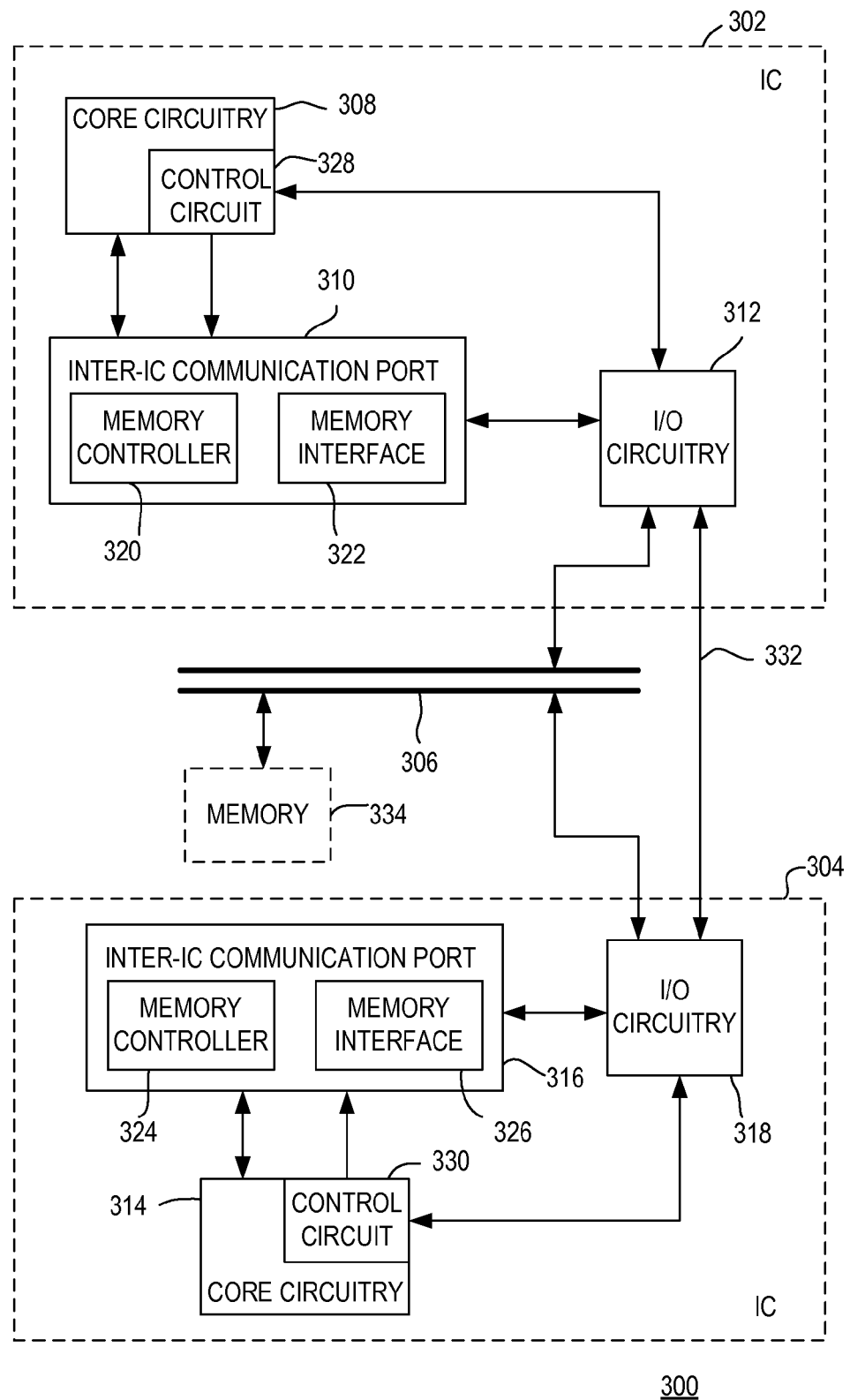
FIG. 3 is a block diagram depicting an integrated circuit (IC) system.

FIG. 3 is a block diagram depicting an integrated circuit (IC) system 300. The IC system 300 includes an IC 302 (also referred to as a "first IC"), an IC 304 (also referred to as a "second IC"), and a memory bus 306. Each of the ICs 302 and 304 are coupled to the memory bus 306. The IC 302 includes core circuitry 308, an inter-IC communication port 310, and input/output (IO) circuitry 312. The IC 304 includes core circuitry 314, an inter-IC communication port 316, and IO circuitry 318. The inter-IC communication port 310 includes a memory controller 320 and a memory interface 322. The inter-IC communication port 316 includes a memory controller 324 and a memory interface 326. Although the memory controller 320 and the memory interface 322 are shown as separate logical elements, it is to be understood that the memory controller 320 and the memory interface 322 may be implemented using a single logical element. Likewise for the memory controller 324 and the memory interface 326.

A first IO bus of the inter-IC communication port 310 is coupled to the core circuitry 308, and a second IO bus of the inter-IC communication port 310 is coupled to the IO circuitry 312. Likewise, a first IO bus of the inter-IC communication port 316 is coupled to the core circuitry 314, and a second IO bus of the inter-IC communication port 316 is coupled to the IO circuitry 318. The IO circuitry 312 and the IO circuitry 318 are each coupled to the memory bus 306.

In operation, the inter-IC communication port 310 is configured to couple the core circuitry 308 and the I/O circuitry 312 through either the memory controller 320 or the memory interface 322. The memory controller 320 is configured to control IO with memory interfaces coupled to the memory bus 306. In particular, the memory controller 320 is configured to write data to a particular memory interface and read data from a particular memory interface. The memory interface 322 is configured to receive IO from a memory controller on the memory bus 306 (e.g., read requests, write requests, etc). The memory interface 322 and the memory controller 320 comport with the memory standard of the memory bus 306. The inter-IC communication port 310 may select between the memory controller 320 and the memory interface 322 in response to a selection signal from a control circuit 328. In some embodiments, the control circuit 328 may be part of the core circuitry 308.

The memory bus 306 and associated memory interfaces and controllers may comport with any type of memory standard known in the art, including dynamic random access memory (DRAM), synchronous DRAM (SDRAM), various versions of double data rate DRAM (DDR-DRAM), various versions of graphics DDR-DRAM (GDDR-DRAM), static random access memory (SRAM), or like type memory standards known in the art. In general, a generic memory interface can be characterized by an address phase, a command phase, and a read/write phase. The primary differences among memory standards involve differences in physical implementation of these phases. It is to be understood that the memory bus 306 and associated memory interfaces and controllers may comport with any type of memory interface that implements the aforementioned phases such that data may be transferred over the memory bus 306 between devices.

Operation of the inter-IC communication port 316 is similar to the inter-IC communication port 310. That is, the inter-IC communication port 316 is configured to couple the core circuitry 314 and the I/O circuitry 318 through either the memory controller 324 or the memory interface 326. The memory controller 324 is configured to control IO with memory interfaces coupled to the memory bus 306. In particular, the memory controller 324 is configured to write data to a particular memory interface and read data from a particular memory interface. The memory interface 326 is configured to receive IO from a memory controller on the memory bus 306 (e.g., read requests, write requests, etc). The memory interface 326 and the memory controller 324 comport with the memory standard of the memory bus 306. The inter-IC communication port 316 may select between the memory controller 324 and the memory interface 326 in response to a selection signal from a control circuit 330. In some embodiments, the control circuit 330 may be part of the core circuitry 308.

Assume for purposes of example that the inter-IC communication port 310 in the first IC 302 selects the memory controller 320, and the inter-IC communication port 316 in the second IC 304 selects the memory interface 326. In such case, the core circuitry 308 can provide output data intended for the core circuitry 314 second IC 304 to the inter-IC communication port 310. The memory controller 320 writes the output data to the memory interface 326 of the inter-IC communication port 316 in the second IC 304. The output data is transferred through the IO circuitry 312, the memory bus 306, and the IO circuitry 318. The core circuitry 314 obtains the output data from the memory interface 326. Consider the reverse scenario. The core circuitry 308 requires input data produced by the core circuitry 314. The core circuitry 314 makes the input data available to the memory interface 326. In such case, the core circuitry 308 can indicate to the memory controller 320 to obtain the input data. The memory controller 320 reads the input data from the memory interface 326 of the inter-IC communication port 316 in the second IC 304. The input data is transferred through the IO circuitry 318, the memory bus 306, and the IO circuitry 312. The memory controller 320 returns the input data to the core circuitry 308. It is to be understood that roles of the first IC 302 and the second IC 304 described above can be reversed such that the inter-IC communication port 316 in the second IC 304 selects the memory controller 324, and the inter-IC communication port 310 in the first IC 302 selects the memory interface 322.

Devices attached to the memory bus 306 include addresses that are part of an overall address space. The memory interface 322 and the memory interface 326 may each be configured with one or more addresses within the address space. The memory controller 320 and the memory controller 324 may each be configured with knowledge of the address space and the particular address or addresses associated with particular devices attached to the bus 306. In some embodiments, such knowledge may be provided to the memory controller 320 and the memory controller 324 by the core circuitry 308 and the core circuitry 314, respectively. Thus, the memory controller 320 can communicate with the memory interface 326 using its assigned address or addresses. Likewise, the memory controller 324 can communicate with the memory interface 322 using its assigned address or addresses. For example, to transmit data from the first IC 302 to the second IC 304, the memory controller 320 can write data to the address or addresses assigned to the memory interface 326. To obtain data from the second IC 304 at the first IC 302, the memory controller 320 can read data from the address or addresses assigned to the memory interface 326. The memory controller 324 can operate similarly with respect to the memory interface 322.

In some embodiments, the memory bus 306 comports with a memory standard that can only have a single controller or "bus master". Thus, when the inter-IC communication port 310 selects the memory controller 320, the memory controller 320 can become the bus master of the memory bus 306. All other devices either isolate themselves from the memory bus 306 or become memory interfaces. Likewise, when the inter-IC communication port 316 selects the memory controller 324, the memory controller 324 can become the bus master of the memory bus 306.

Which of the first IC 302 and the second IC 304 controls the memory bus 306 with a bus mastering memory controller can be negotiated using a sideband bus 332. The control circuit 328 may be configured to generate a bus control notification, which signals the intention to cause selection of the memory controller 320 in the inter-IC communication port 310. The control circuit 328 may transmit the bus control notification to the control circuit 330 over the sideband bus 332. In particular, the control circuit 328 can be coupled to the IO circuitry 312, which is in turn coupled to the IO circuitry 318 by the sideband bus 332. The control circuit 330 is likewise coupled to the IO circuitry 318. In this manner, the first IC 302 can notify the second IC 304 of its intention to control the memory bus 306. In some embodiments, the second IC 304 can respond to the bus control notification over the sideband bus 332 with a "yes" or "no" response (e.g., the second IC 304 may already be controlling the memory bus 306).

In another case, control circuit 328 may transmit a bus relinquish notification, which signals the intention to cause the selection of the memory interface 322 in the inter-IC communication port 310. The control circuit 328 may transmit the bus relinquish notification to the control circuit 330 over the sideband bus 332. The bus relinquish notification can be acknowledged by the control circuit 330 (e.g., with a yes or no response). Upon receiving a bus relinquish notification, the control circuit 330 may take control of the memory bus 306 by causing the inter-IC communication port 316 to select the memory controller 324. The control circuit 330 operates similarly to the control circuit 328 with respect to transmitting bus control and relinquishment notifications over the sideband bus 332, and the control circuit 328 operates similarly to the control circuit 330 with respect to acknowledging and responding to such notifications.

In the embodiments described above, the first IC 302 and the second IC 304 directly communicate data over the memory bus 306. In alternative embodiments, the first IC 302 and the second IC 304 can communicate data indirectly through a memory 334 coupled to the memory bus 306. For example, consider again the case where the inter-IC communication port 310 selects the memory controller 320, and the inter-IC communication port 316 selects the memory interface 326. The core circuitry 308 can provide output data intended for the core circuitry 314 in the second IC 304 to the memory controller 320, which in turn writes the output data to the memory 334. The control circuit 328 then sends a bus relinquish notification to the control circuit 330 over the sideband bus 332 and causes the inter-IC communication port 310 to select the memory interface 322 (the control circuit 328 can wait for an acknowledgement from the control circuit 330 before selecting the memory interface 322). The control circuit 330 can then gain control of the memory bus 306 by causing the inter-IC communication port 316 to select the memory controller 324. Once gaining control of the memory bus 306, the core circuitry 314 can direct the memory controller 324 to read the output data from the memory 334. It is to be understood that the second IC 304 can provide output data to the first IC 302 in a similar fashion.

For purposes of clarity by example, aspects of the invention have been described with respect to a pair of ICs coupled to the memory bus 306. It is to be understood that, in general, a plurality of ICs configured similarly to the ICs 302 and 304 can be coupled to the memory bus 306 and the sideband bus 332. Such additional ICs can operate similarly with respect to the ICs 302 and 304 described above.

Figure 4:
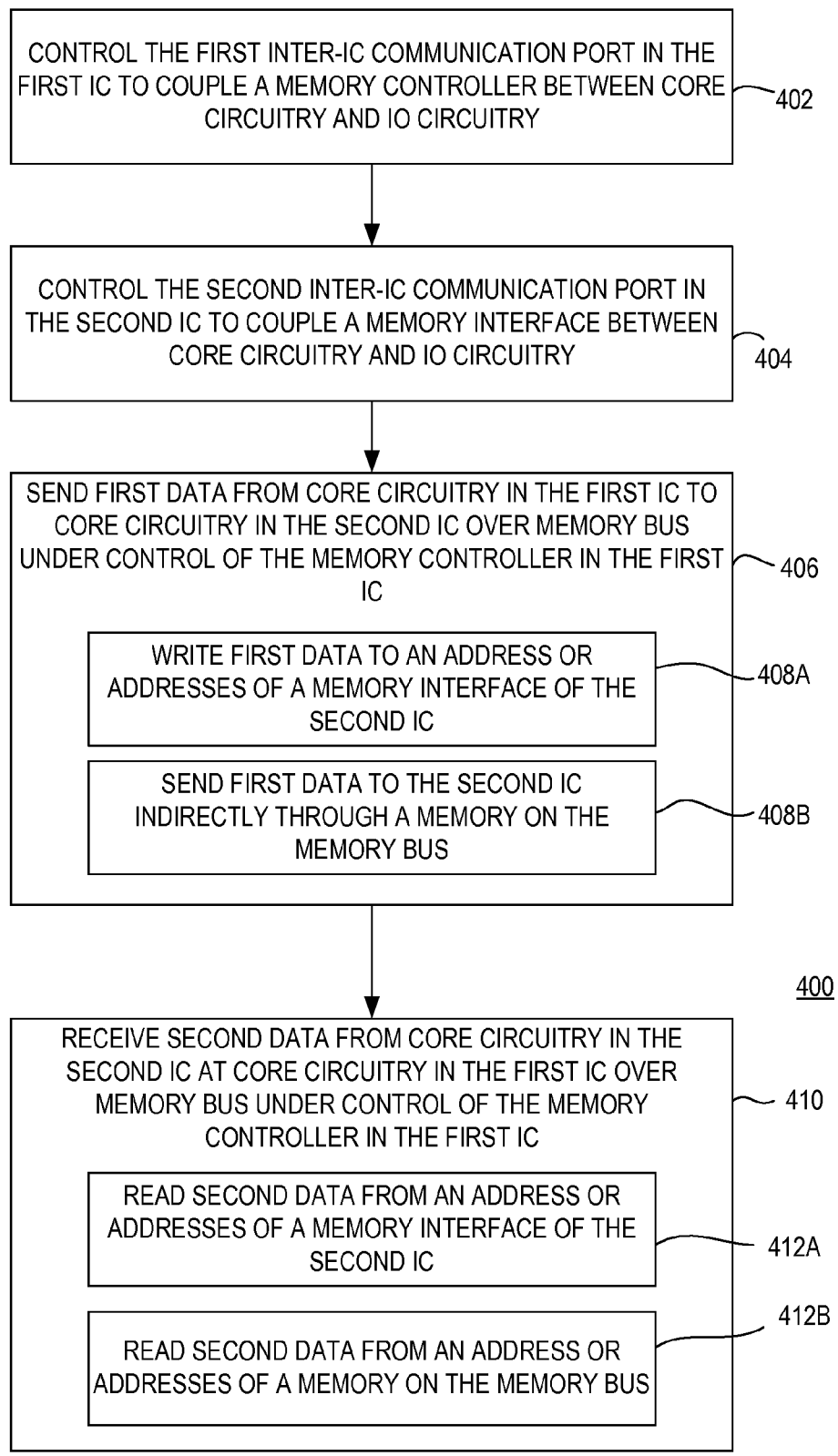
FIG. 4 is a flow diagram depicting a method of communicating between a first IC and a second IC.

FIG. 4 is a flow diagram depicting a method 400 of communicating between a first IC and a second IC. The method 400 may be understood with respect to the system 300 of FIG. 3. The method 400 begins at step 402, where the control circuit 328 controls the inter-IC communication port 310 (a first inter-IC communication port) to couple the memory controller 320 between the core circuitry 308 (first core circuitry) and the IO circuitry 312 (first IO circuitry). At step 404, the control circuit 330 controls the inter-IC communication port 316 (second inter-IC communication port) to couple the memory interface 326 between the core circuitry 314 (second core circuitry) and the IO circuitry 318 (second IO circuitry). At step 406, the first core circuitry 308 sends first data to the second core circuitry 314 over the memory bus 306 under control of the memory controller 320. In some embodiments, the first core circuitry 308 sends the first data to the second core circuitry 314 directly by writing the first data to an address or addresses of the memory interface 326 (step 408A). Alternatively, the first core circuitry 308 can send the first data to the second core circuitry 314 indirectly through a memory on the memory bus (step 408B).

Figure 5:
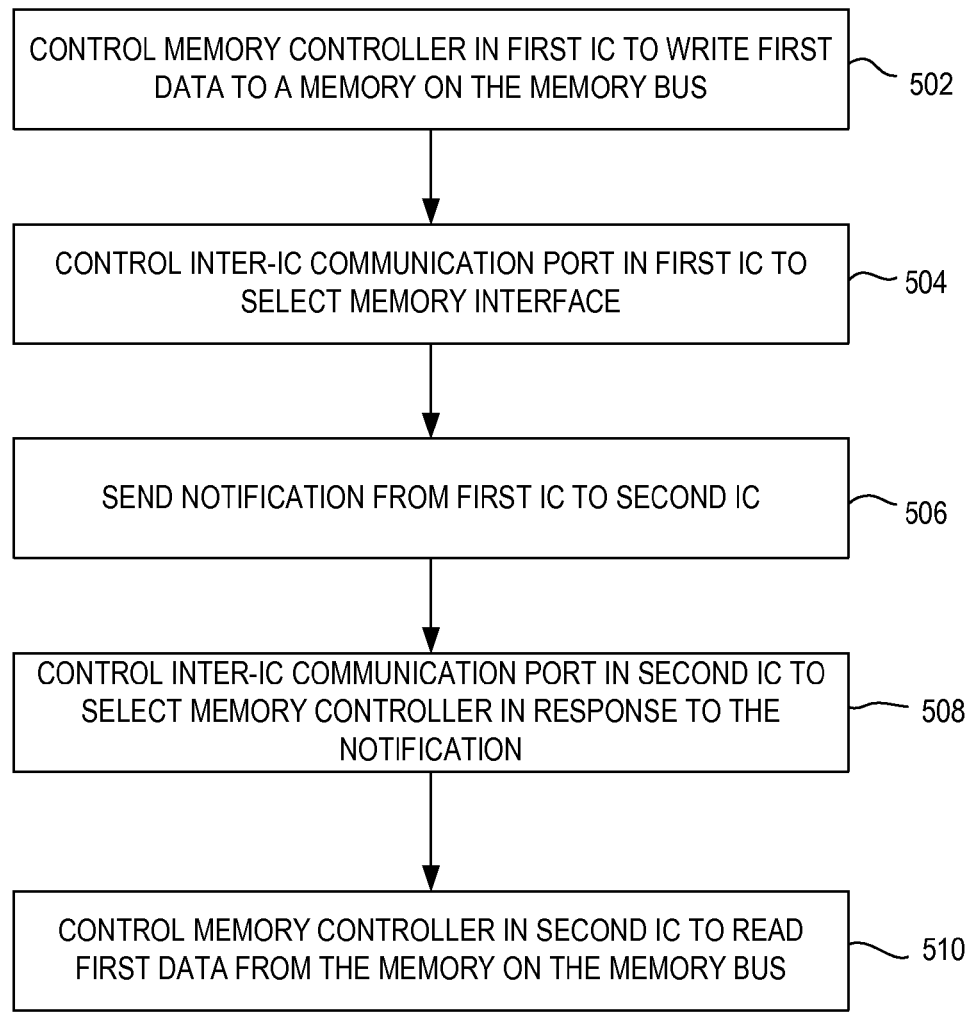
FIG. 5 is a flow diagram depicting an exemplary embodiment of a method for sending data from a first IC to as second IC indirectly through a memory.

FIG. 5 is a flow diagram depicting an exemplary embodiment of a method 500 for sending the first data from the first core circuitry 308 to the second core circuitry 314 indirectly through a memory. The method 500 may be performed in step 408B of the method 400. At step 502, the control circuit 328 controls the memory controller 320 to write the first data to the memory 334 on the memory bus 306. At step 504, the control circuit 328 controls the inter-IC communication port 310 to select the memory interface 322. At step 506, the control circuit 328 sends a notification to the second IC. At step 508, the control circuit 330 controls the inter-IC communication port 316 to select the memory controller 324 in response to the notification. At step 510, the core circuitry 314 controls the memory controller to read the first data from the memory.

Returning to FIG. 4, at step 410, the first core circuitry 308 can receive second data from the second core circuitry 314 under control of the memory controller 320. In some embodiments, the first core circuitry 308 receives the second data from the second core circuitry 314 directly by reading the data from an address or addresses of the memory interface 326 (step 412A). Alternatively, the first core circuitry 308 can receive the second data from the second core circuitry 314 indirectly through the memory of the memory bus (step 412B).

While the method 400 has been described a step 406 of sending data from the first IC 302 to the second IC 304 followed by the step 410 of receiving data at the first IC 302 from the second IC 304, it is to be understood that the order of the steps 406 and 410 can be reversed. In some cases, only step 406 may be performed. In other cases, only step 410 may be performed. In still other cases, the roles of the first IC 302 and the second IC 304 may be reversed in the method 400.

Figure 6:
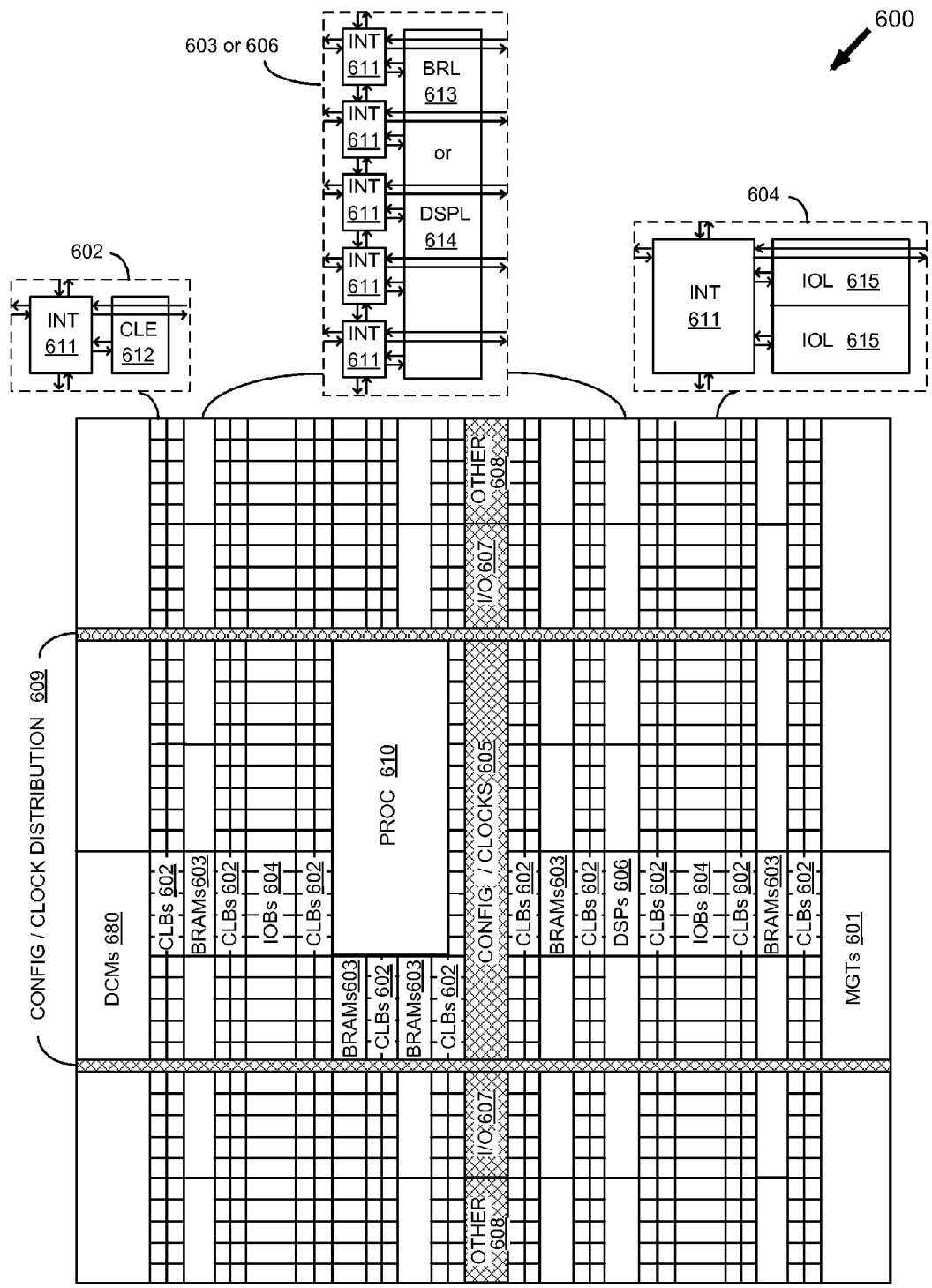
FIG. 6 illustrates an FPGA architecture.

FIG. 6 illustrates an FPGA architecture 600 that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607) (e.g., configuration ports and clock ports), and other programmable logic 608 such as digital clock managers, analog-to-digital converters, system monitoring logic, and so forth. A given set of programmable tiles of an FPGA is referred to herein as a programmable fabric of the FPGA.

In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element (INT 611) also includes the connections to and from the programmable logic element within the same tile, as shown by the examples included at the top of FIG. 6.

For example, a CLB 602 can include a configurable logic element (CLE 612) that can be programmed to implement user logic plus a single programmable interconnect element (INT 611). A BRAM 603 can include a BRAM logic element (BRL 613) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element (INT 611). As will be clear to those of skill in the art, the actual I/O pads connected, for example, to the I/O logic element 615 are manufactured using metal layered above the various illustrated logic blocks, and typically are not confined to the area of the input/output logic element 615.

The FPGA architecture 600 also includes one or more dedicated processor blocks (PROC 610). The processor block 610 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 610 is coupled to the programmable logic of the FPGA in a well known manner.

In the pictured embodiment, a columnar area near the center of the die is used for configuration, clock, and other control logic. Horizontal areas 609 extending from this column are used to distribute the clocks and configuration signals across the breadth of the FPGA. In other embodiments, the configuration logic may be located in different areas of the FPGA die, such as in the corners of the FPGA die. Configuration information for the programmable logic is stored in configuration memory. The configuration logic 605 provides an interface to, and loads configuration data to, the configuration memory. A stream of configuration data ("configuration bitstream") may be coupled to the configuration logic 605, which in turn loads the configuration memory.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 6 are purely exemplary. For example, in an actual FPGA more than one adjacent column of CLBs is typically included wherever the CLBs appear, to facilitate the efficient implementation of user logic.

Referring to FIGS. 3 and 6, in some embodiments, the first IC 302 and the second IC 304 are each a programmable logic device (PLD), such as an FPGA configured similarly to the FPGA 600. The core circuitry 308 and the core circuitry 314 may each comprise programmable fabric in their respective PLDs. The IO circuitry 312 and the IO circuitry 318 may each comprise IOBs in their respective PLDs. The control circuits 328 and 330 may be configured in the programmable fabric (e.g., using CLBs, etc.) or may comprise dedicated logic circuits embedded in the programmable fabric (e.g., similar to a DSP or BRAM element). Likewise, the inter-IC communication ports 310 and 316 may be configured in programmable logic, or may comprise dedicated logic circuits embedded in the programmable logic.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. An integrated circuit (IC), comprising:
 core circuitry configured to process input data and provide output data;
 input/output (IO) circuitry configured to receive the input data, and transmit the output data;
 wherein the IO circuitry is configured to communicate with a memory bus and a sideband bus;
 a control circuit configured to provide a selection signal; and
 an inter-IC communication port coupled between the core circuitry and the IO circuitry and configured to pass the input data and the output data, the inter-IC communication port having a first memory interface and a first memory controller,
 wherein the control circuit is coupled to the IO circuitry and is configured to provide a first notification in response to configuring the selection signal to select the first memory interface, and the IO circuitry is configured to send the first notification to another IC on the memory bus over the sideband bus;
 wherein the first memory controller is configured to transmit memory read requests to retrieve the input data and memory write requests with the output data via the IO circuitry to a second memory interface external to the IC;
 wherein the first memory interface is configured to receive memory read requests for the output data and memory write requests with the input data via the IO circuitry from a second memory controller external to the IC; and
 wherein the inter-IC communication port is configured to selectively couple either the first memory interface or the first memory controller between the core circuitry and the IO circuitry responsive to the selection signal.

2. The IC of claim 1, wherein:
 the IC comprises a programmable logic device (PLD);
 the core circuitry comprises a programmable fabric; and
 the IO circuitry comprises input/output logic blocks (IOBs).

3. The IC of claim 1, wherein the first memory interface of the inter-IC communication port is configured with an address on the memory bus.

4. The IC of claim 1, wherein the first memory controller is configured to be a bus master of the memory bus.

5. The IC of claim 1, wherein:
 the control circuit configures the selection signal to select the first memory controller in response to a second notification; and
 the IO circuitry is configured to receive the second notification over the sideband bus from another IC on the memory bus.

6. An apparatus for communication between a first integrated circuit (IC) and a second IC, comprising:
 first core circuitry in the first IC;
 second core circuitry in the second IC;
 a control circuit in the first IC and configured to provide a selection signal;
 a first inter-IC communication port in the first IC coupled to the first core circuitry and configured to implement a first memory controller and a first memory interface;
 a second inter-IC communication port in the second IC coupled to the second core circuitry and configured to implement a second memory controller and a second memory interface;
 a memory bus;
 a sideband bus;
 first input/output (IO) circuitry in the first IC coupled between the memory bus and the first inter-IC communication port; and
 second IO circuitry in the second IC coupled between the memory bus and the second inter-IC communication port;
 wherein the control circuit is coupled to the first IO circuitry and is configured to provide a notification in response to configuring the selection signal to select the first memory interface, and the IO circuitry is configured to send the notification to the second IO circuitry over the sideband bus;
 wherein the first memory controller in the first IC is configured to transmit memory read requests and memory write requests to the second memory interface in the second IC, the memory read and memory write requests transmitted responsive to the first core circuitry, and transmitted via the first IO circuitry, memory bus, and second I/O circuitry; and wherein the second memory interface in the second IC is configured to return data from the second core circuitry to the first memory controller via the second IO circuitry, memory bus, and first IO circuitry in response the memory read requests, and provide data to the second core circuitry in response to the memory write requests.

7. The apparatus of claim 6, wherein:

the first memory controller is a bus master of the memory bus; and the second memory interface is configured with an address on the memory bus.

8. The apparatus of claim 7, wherein the first core circuitry is configured to send data to the second core circuitry by controlling the first memory controller to write the data to the address of the second memory interface over the memory bus.

9. The apparatus of claim 7, wherein the first core circuitry is configured to receive data from the second core circuitry by controlling the first memory controller to read the data from the address of the second memory interface over the memory bus.

10. The apparatus of claim 6, wherein:

the first IC comprises a first programmable logic device (PLD), the first core circuitry comprises a programmable fabric in the first PLD, and the first IO circuitry comprises first input/output logic blocks (IOBs); and the second IC comprises a second PLD, the second core circuitry comprises a programmable fabric in the second PLD, and the second IO circuitry comprises second input/output logic blocks (IOBs).

11. The apparatus of claim 6, further comprising:

a memory coupled to the memory bus;

wherein the first core circuitry is configured to send data to be read by the second core circuitry by controlling the first memory controller to write the data to the memory over the memory bus.

12. The apparatus of claim 6, further comprising:

a memory coupled to the memory bus having data stored therein produced by the second core circuitry;

wherein the first core circuitry is configured to receive the data by controlling the first memory controller to read the data from the memory over the memory bus.

13. A method of communicating between a first integrated circuit (IC) and a second IC, the first IC including a first inter-IC communication port having memory controller and memory interface, the second IC including a second inter-IC communication port having a memory controller and a memory interface, the method comprising:

controlling the first inter-IC communication port to couple the memory controller therein between first core circuitry and first input/output (IO) circuitry in the first IC;

controlling the second inter-IC communication port to couple the memory interface between second core circuitry and second IO circuitry in the second IC;

sending memory write requests from the memory controller in the first IC to the memory interface in the second IC, the sending responsive to the first core circuitry, and the memory write requests sent via the first IO circuitry, a memory bus, and the second IO circuitry;

wherein the sending includes:

controlling the memory controller in the first inter-IC communication port to write the first data to a memory coupled to the memory bus;

controlling the first inter-IC communication port to couple the memory interface therein between the first core circuitry and the first IO circuitry in the first IC;

sending a notification from the first IC to the second IC;

controlling the second inter-IC communication port to couple the memory controller therein between the second core circuitry and the second IO circuitry in the second IC in response to the notification; and controlling the memory controller in the second inter-IC communication port to read the first data from the memory; and providing by the memory interface in the second IC, first data in the memory write requests to the second core circuitry.

14. The method of claim 13, wherein the sending comprises:

controlling the memory controller in the first inter-IC communication port to write the first data to an address configured in the memory interface.

15. The method of claim 13, further comprising:

sending memory read requests from the memory controller in the first IC to the memory interface in the second IC, the reading responsive to the first core circuitry, and the memory read requests sent via the first IO circuitry, the memory bus, and the second IO circuitry;

sending second data from the memory interface in the second IC to the memory controller in the first IC via the second IO circuitry, memory bus, and first IO circuitry in response the memory read requests.

16. The method of claim 15, wherein the sending read requests comprises:

controlling the memory controller in the first inter-IC communication port to read the second data from an address configured in the memory interface.

17. The method of claim 15, wherein the sending read requests comprises:

controlling the memory controller to read the second data from a memory coupled to the memory bus.

\* \* \* \* \*